United States Patent
Gao et al.

(10) Patent No.: US 7,680,659 B2
(45) Date of Patent: Mar. 16, 2010

(54) DISCRIMINATIVE TRAINING FOR LANGUAGE MODELING

(75) Inventors: Jianfeng Gao, Beijing (CN); Hisami Suzuki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 11/142,432

(22) Filed: Jun. 1, 2005

(65) Prior Publication Data

US 2006/0277033 A1  Dec. 7, 2006

(51) Int. Cl.
*G10L 15/06* (2006.01)
*G10L 15/00* (2006.01)
*G06F 17/20* (2006.01)

(52) U.S. Cl. .................................. 704/236; 704/10

(58) Field of Classification Search ............... 704/1–10, 704/236, 240, 243, 246, 251–257, 231, 239, 704/255; 370/352; 706/8, 21, 45, 52; 715/513, 715/700

See application file for complete search history.

(56) References Cited

U.S. PATENT DOCUMENTS

| | | | | |
|---|---|---|---|---|
| 5,027,406 A * | 6/1991 | Roberts et al. | ............. | 704/244 |
| 5,267,345 A * | 11/1993 | Brown et al. | ............. | 704/255 |
| 5,333,236 A * | 7/1994 | Bahl et al. | ............. | 704/256.4 |
| 5,467,425 A * | 11/1995 | Lau et al. | ............. | 704/243 |
| 5,606,644 A * | 2/1997 | Chou et al. | ............. | 704/243 |
| 5,680,511 A * | 10/1997 | Baker et al. | ............. | 704/257 |
| 5,684,925 A * | 11/1997 | Morin et al. | ............. | 704/254 |
| 5,754,736 A * | 5/1998 | Aust | ............. | 704/252 |
| 5,787,230 A * | 7/1998 | Lee | ............. | 704/235 |
| 5,963,893 A * | 10/1999 | Halstead et al. | ............. | 704/9 |
| 6,006,182 A * | 12/1999 | Fakhr et al. | ............. | 704/231 |
| 6,182,039 B1 * | 1/2001 | Rigazio et al. | ............. | 704/257 |
| 6,233,555 B1 * | 5/2001 | Parthasarathy et al. | ....... | 704/249 |
| 6,292,778 B1 * | 9/2001 | Sukkar | ............. | 704/256.4 |
| 6,453,292 B2 * | 9/2002 | Ramaswamy et al. | ........ | 704/235 |
| 6,456,969 B1 * | 9/2002 | Beyerlein | ............. | 704/234 |
| 6,542,866 B1 * | 4/2003 | Jiang et al. | ............. | 704/255 |
| 6,629,073 B1 * | 9/2003 | Hon et al. | ............. | 704/256.4 |
| 6,691,088 B1 * | 2/2004 | Blasig | ............. | 704/240 |
| 7,054,810 B2 * | 5/2006 | Gao et al. | ............. | 704/231 |
| 7,120,582 B1 * | 10/2006 | Young et al. | ............. | 704/255 |
| 7,219,056 B2 * | 5/2007 | Axelrod et al. | ............. | 704/235 |
| 7,379,867 B2 * | 5/2008 | Chelba et al. | ............. | 704/236 |

(Continued)

FOREIGN PATENT DOCUMENTS

EP    1226574 B1 *  4/2004

(Continued)

OTHER PUBLICATIONS

Kuo et al. "Discriminative Training of Language Models for Speech Recognition", IEEE International Conference on Acoustics, Speech, and Signal Processing, 2002. Proceedings., I-325-I-328.*

(Continued)

*Primary Examiner*—David R Hudspeth
*Assistant Examiner*—David Kovacek
(74) *Attorney, Agent, or Firm*—Theodore M. Magee; Westman, Champlin & Kelly, P.A.

(57) ABSTRACT

A method of training language model parameters trains discriminative model parameters in the language model based on a performance measure having discrete values.

14 Claims, 5 Drawing Sheets

U.S. PATENT DOCUMENTS

| | | | | |
|---|---|---|---|---|
| 7,409,346 | B2* | 8/2008 | Acero et al. | 704/254 |
| 2002/0032549 | A1* | 3/2002 | Axelrod et al. | 703/2 |
| 2002/0107683 | A1* | 8/2002 | Eisele | 704/2 |
| 2003/0023436 | A1* | 1/2003 | Eide | 704/236 |
| 2003/0023438 | A1* | 1/2003 | Schramm et al. | 704/240 |
| 2003/0139926 | A1* | 7/2003 | Jia et al. | 704/236 |
| 2004/0153307 | A1* | 8/2004 | Tishby et al. | 704/4 |
| 2004/0210437 | A1* | 10/2004 | Baker | 704/251 |
| 2004/0215457 | A1* | 10/2004 | Meyer | 704/251 |
| 2004/0249628 | A1* | 12/2004 | Chelba et al. | 704/4 |
| 2007/0282596 | A1* | 12/2007 | Suzuki et al. | 704/9 |

FOREIGN PATENT DOCUMENTS

WO      WO 9840876 A1 * 9/1998

OTHER PUBLICATIONS

Kim et al. "Discriminative Training for Concatenative Speech Synthesis", IEEE Signal Processing Letters vol. 11 Issue 1, Jan. 2004, 40-43.*

Bacchiani, Michael et al., "Unsupervised Language Model Adaptation," In Proceedings of ICASPSP, 224-227.

Bacchiani, Michael et al., "Language Model Adaptation with MAP Estimation and the Perceptron Algorithm," In Proceedings of HLT-NAACL, pp. 21-24.

Chen, Stanley et al., "Topic Adaptation for Language Modeling Using Unnormalized Exponential Models," In Proceedings of ICASSP.

Clarkson, P.R., and A.J. Robinson. 1997. Language Model Adaptation Using Mixtures and an Exponentially Decaying Cache. In *Proceedings of ICASSP*.

Gao, Jianfeng, Joshua Goodman and Jiangbo Miao. 2001. The Use of Clustering Techniques for Language Model—Application to Asian Language. *Computational Linguistics and Chinese Language Processing*, 6-1: 27-60.

Iyer, Rukmini, Mari Ostendorf and Herb Gish. 1997. Using Out-of-Domain Data to Improve In-Domain Language Models. In *IEEE Signal Processing Letters*, 4-8: 221-223.

Rosenfeld, Ronald. 1996. A Maximum Entropy Approach to Adaptive Statistical Language Modeling. *Computer, Speech and Language*, 10: 187-228.

Collins, Michael. 2002. Discriminative training methods for Hidden Markov Models: theory and experiments with the perceptron algorithm. In *EMNLP 2002*.

Collins, Michael. 2000. Discriminative reranking for natural language parsing. In: *ICML 2000*.

Della Pietra, S., Della Pietra, V., and Lafferty, J. 1997. Inducing features of random fields. *IEEE Transactions on Pattern Analysis and Machine Intelligence*, 19, 380-393.

Freund, Yoav, and Robert E. Schapire. 1999. Large margin classification using the perceptron algorithm. In *Machine Learning*, 37(3):277-296.

Freund, Yoav, Raj Iyer, Robert E. Schapire, and Yoram Singer. 1998. An efficient boosting algorithm for combining preferences. In *ICML '98*.

Juang, Biing-Hwang, Wu Chou and Chin-Hui Lee. 1997. Minimum classification error rate methods for speech recognition, *IEEE Tran. Speech and Audio Processing*. vol. 5, No. 3. pp. 257-265.

Gao, Jianfeng, Hisami Suzuki and Yang Wen. 2002. Exploiting headword dependency and predictive clustering for language modeling. In: *EMNLP 2002*.

Och, Franz. 2003. Minimum error rate training in statistical machine translation. In: *ACL2003*.

Quirk, C., A. Merezes and C. Cherry. 2004. Dependency tree translation: syntactically informed phrasal SMT. To appear.

Roark, Brian, Murat Salaclar and Michael Collins. 2004. Corrective Language Modeling for Large Vocabulary ASR with the Perceptron Algorithm. In *Proceedings of ICASSP*: 749-752.

Seymore, Kristie et al., "Using Story Topics for Language Model Adaptation," In Proceedings of Eurospeech '97, 1997.

* cited by examiner

DISCRIMINATIVE TRAINING FOR LANGUAGE MODELING

BACKGROUND

The task of language modeling is to estimate the likelihood of a word string. This is fundamental to a wide range of applications such as speech recognition and Asian language text input.

The traditional approach to language modeling uses a parametric model with maximum likelihood estimation (MLE), usually with smoothing methods to deal with data sparseness problems. This approach is optimal under the assumption that the true distribution of data on which the parametric model is based is known. Unfortunately, this assumption rarely holds in realistic applications.

An alternative approach to language modeling is based on the framework of discriminative training, which uses a much weaker assumption that training and test data are generated from the same distribution but the form of the distribution is unknown. Unlike the traditional approach that maximizes a function (i.e. likelihood of training data) that is loosely associated with the error rate, discriminative training methods ideally aim to minimize the same performance measure used to evaluate the language model, namely the error rate on training data.

However, this ideal has not been achieved because the error rate of a given finite set of training samples is usually a set of discrete values that appear as a step function (or piecewise constant function) of model parameters, and thus cannot be easily minimized. To address the problem, previous research has concentrated on the development of a loss function that provides a smooth loss curve that approximates the error rate. Using such loss functions adds theoretically appealing properties, such as convergence and bounded generalization error. However, the minimization of a loss function instead of the error rate means that such systems are optimizing a different performance measure than the performance measure that is used to evaluate the system that a language model is applied in. As a result, training the language model to optimize the loss function does not guarantee that the language model will provide a minimum number of errors in realistic applications.

SUMMARY

A method of training language model parameters trains discriminative model parameters in the language model based on a performance measure having discrete values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
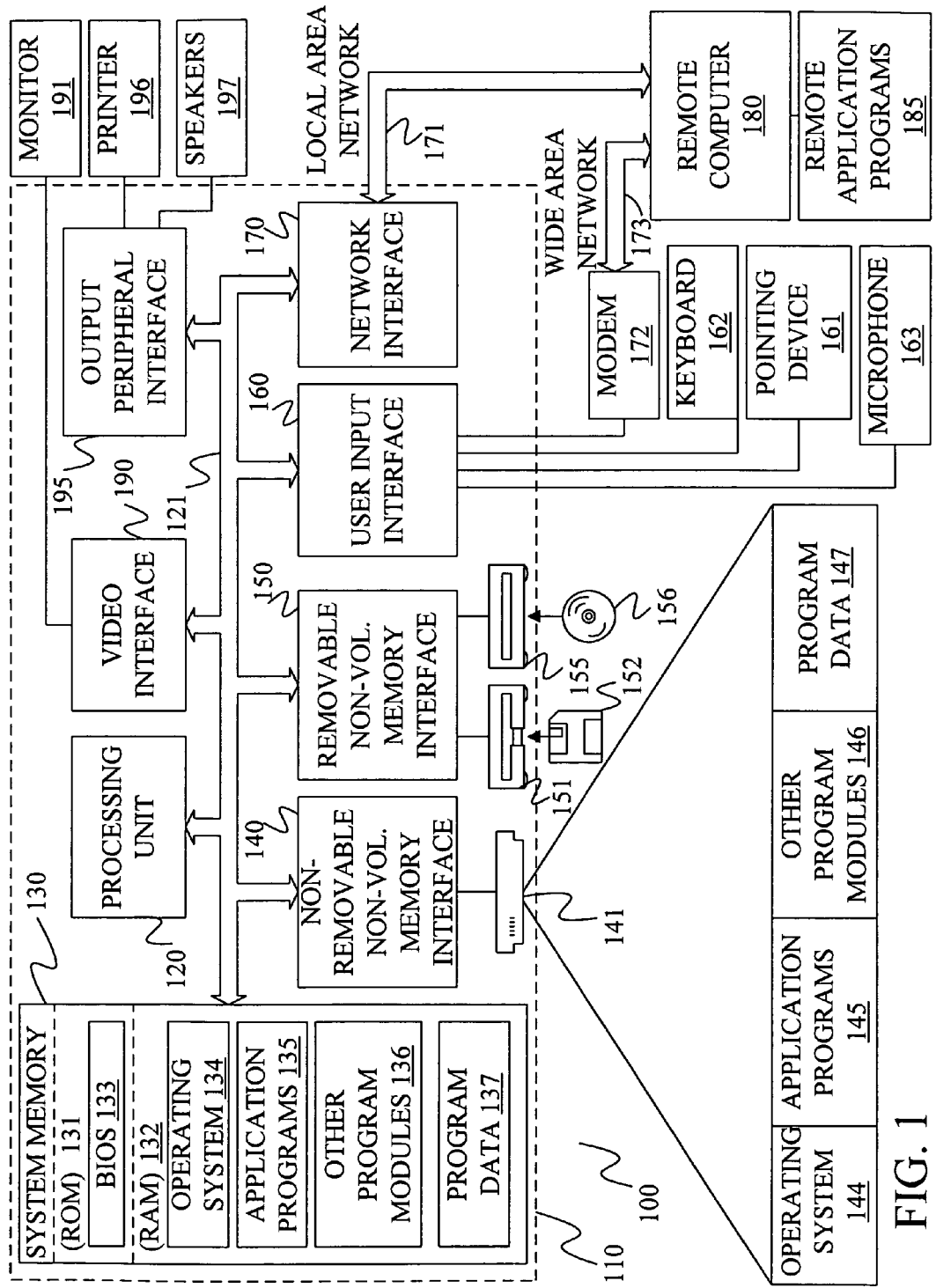
FIG. 1 is a block diagram of one computing environment in which embodiments of the present invention may be practiced.

FIG. 1 illustrates an example of a suitable computing system environment 100 on which embodiments of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general purpose or special purpose computing system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Some embodiments of the invention are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing embodiments of the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN). 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
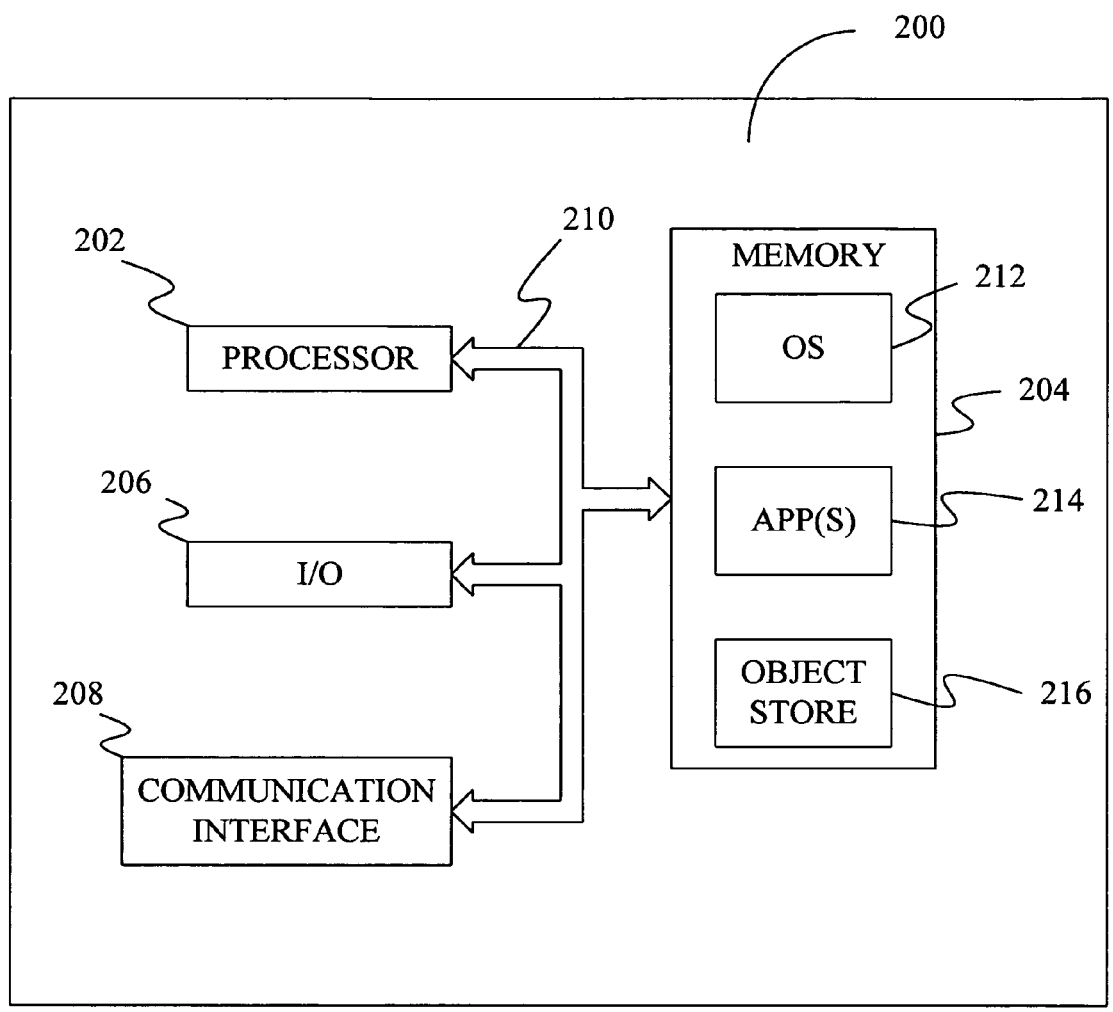
FIG. 2 is a block diagram of an alternative computing environment in which embodiments of the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Many embodiments of the present invention provide a method of training discriminative model parameters by attempting to minimize the error rate of the word sequences identified using the model parameters instead of optimizing a loss function approximation to the error rate.

Under one embodiment of the present invention, the discriminative language model is a linear discriminative function that provides a score for each of a set of candidate word sequences. The linear discriminative function uses a sum of weighted feature functions such as:

$$\text{Score}(W, \lambda) = \lambda f(W) = \sum_{d=0}^{D} \lambda_d f_d(W) \quad \text{EQ. 1}$$

where W is the candidate word sequence, $\lambda$ is a vector of discriminative model parameters, $\lambda=\{\lambda_0,\lambda_1,\ldots,\lambda_D\}$ which are weights applied to the values of feature functions $f=\{f_0, f_1,\ldots,f_D\}$, where D+1 is the number of features used in producing a score for a word sequence. Examples of features that can be used include a negative logarithm probability produced by a generative word trigram model, and N-gram counts for specific N-grams in the word sequence. Those skilled in the art will recognize that other features could be used with the present invention.

Thus, given a phonetic string A, the selection of a word sequence is defined as:

$$W^*(A, \lambda) = \underset{W \in \text{GEN}(A)}{\text{argmax}} \text{Score}(W, \lambda) \quad \text{EQ. 2}$$

where W is one of the set of word strings that can be formed from the phonetic sequence A.

Figure 3:
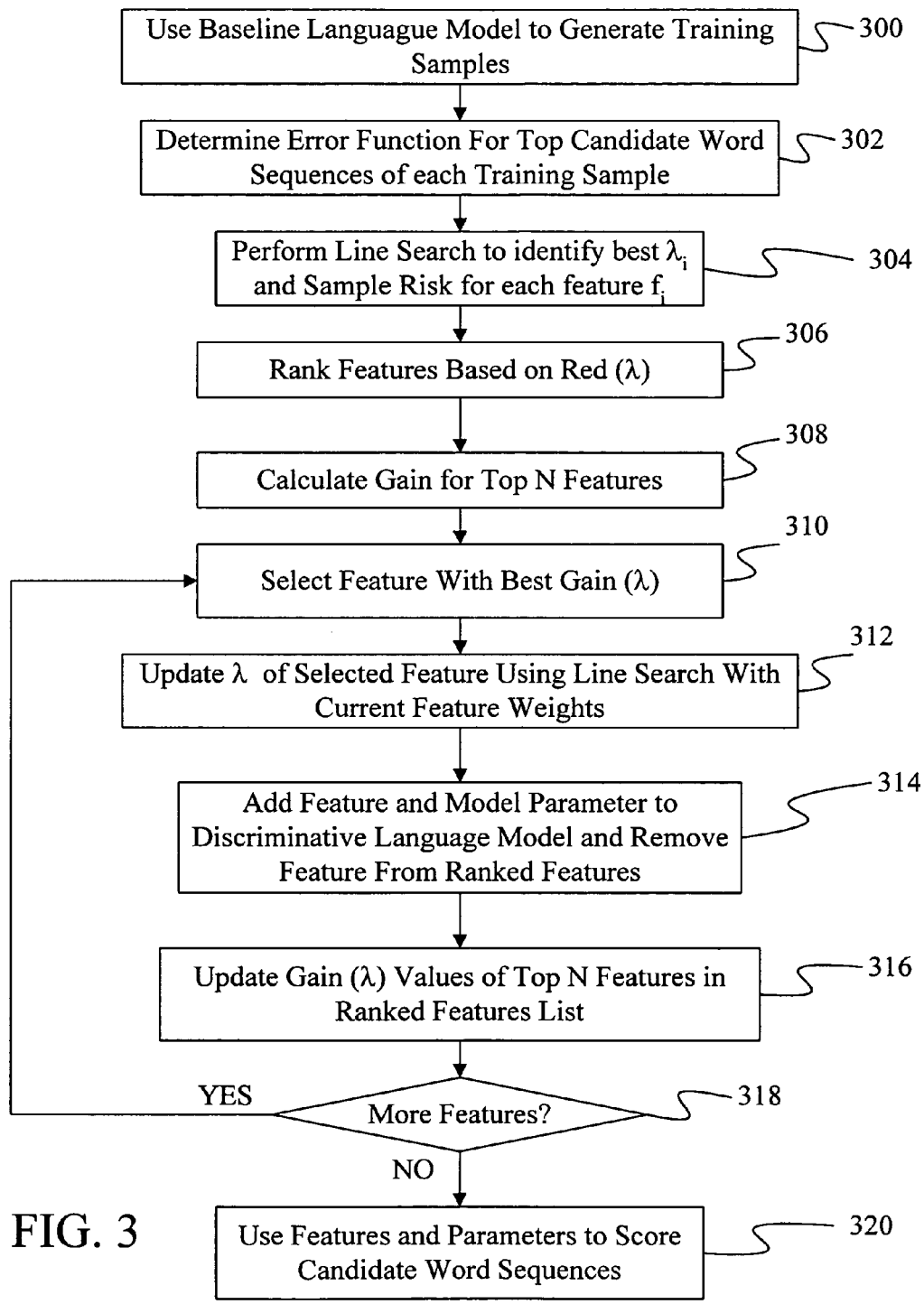
FIG. 3 is a flow diagram of a method of training discriminative model parameters under one embodiment of the present invention.

In order to use the discriminative language model, the features for the model must be selected and their respective model parameters must be trained. FIG. 3 provides a flow diagram and FIG. 4 provides a block diagram of elements used to select candidate features and to train the discriminative model parameters under one embodiment of the present invention.

Figure 4:
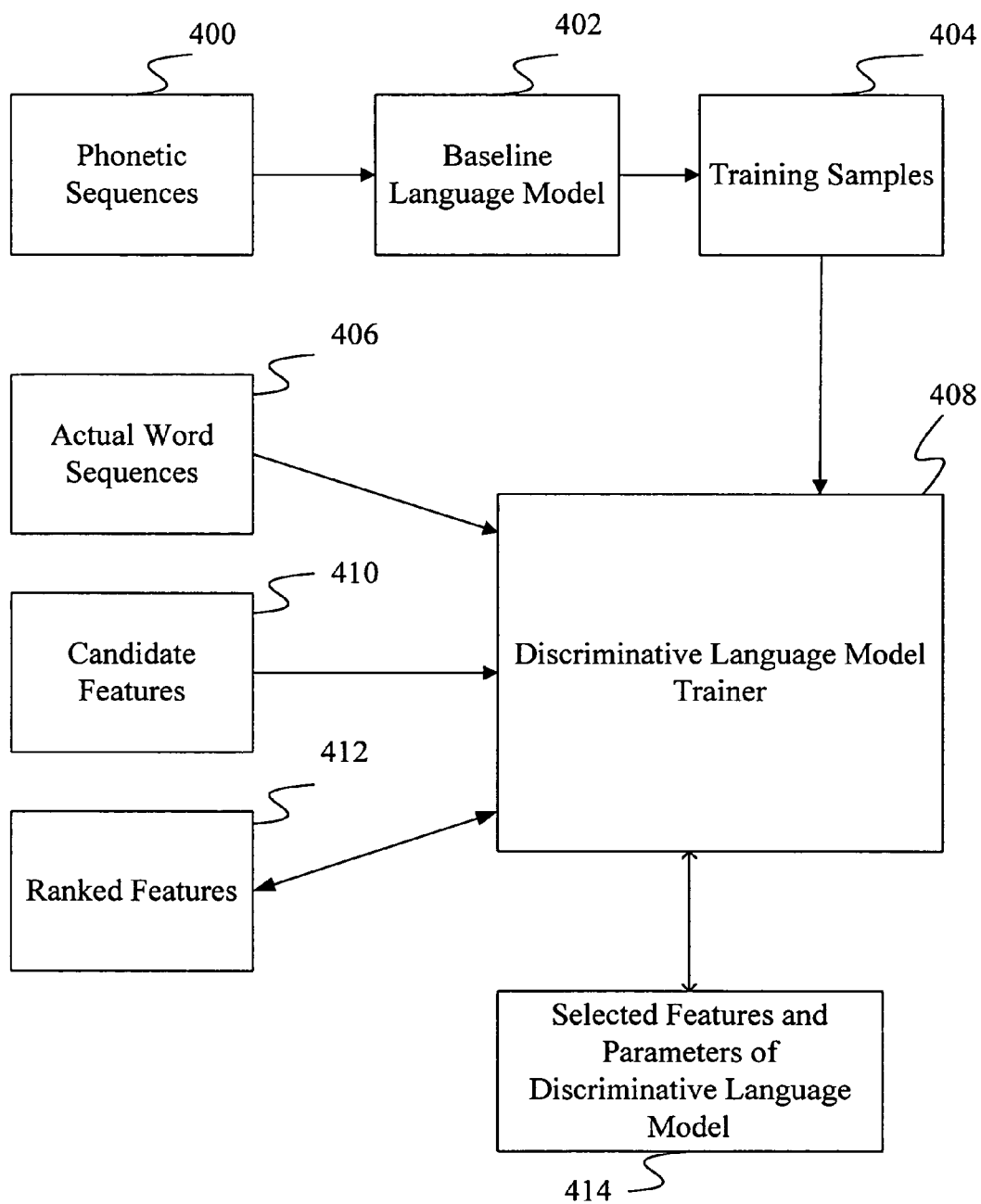
FIG. 4 is a block diagram of elements used to train discriminative model parameters under various embodiments of the present invention.

In step 300 of FIG. 3, phonetic sequences 400 of FIG. 4 are provided to a baseline language model 402 to produce a set of training samples 404. Each training sample corresponds to a single phonetic sequence and includes a list of candidate word sequences that baseline language model 402 considers most likely given the phonetic sequences 400. In addition, baseline language model 402 designates one of the candidate word sequences as being the most likely word sequence. Under many embodiments, the baseline language model is a trigram model that uses the Markov assumption that the probability of a current word is based only on the identity of the current word and the identity of the two words that precede it. Using these probabilities, baseline language model 402 is able to determine a negative log probability for each candidate word sequence.

At step 302, a discriminative model trainer 408 evaluates an error function for the top candidate identified by baseline language model 402 in each of training samples 404. This error function is determined using an actual word sequence 406 that corresponds to phonetic sequences 400. In general, the error function provides a count of one for each word in actual word sequences 406 that is replaced with a different word in training samples 404 or is omitted from training samples 404. In addition, any extra word inserted into training sample 404 that is not found in actual word sequence 406 also adds one to the count. Summing the values of the error function for the training samples produces the sample risk for the baseline language model, $(SR(\lambda_0))$.

At step 304, discriminative model trainer 408 performs a line search to identify the best weight $\lambda_i$ and associated sample risk, $SR(\lambda_i)$, for each feature $f_i(W)$, $i>0$, in a set of candidate features 410. The weight of the base feature, $\lambda_0$, is fixed during the training procedure. Under many embodiments, candidate features 410 include features for specific N-grams, which add one to a count each time a specific N-gram is found in a word sequence. A method for performing such a line search is shown in FIG. 5.

Figure 5:
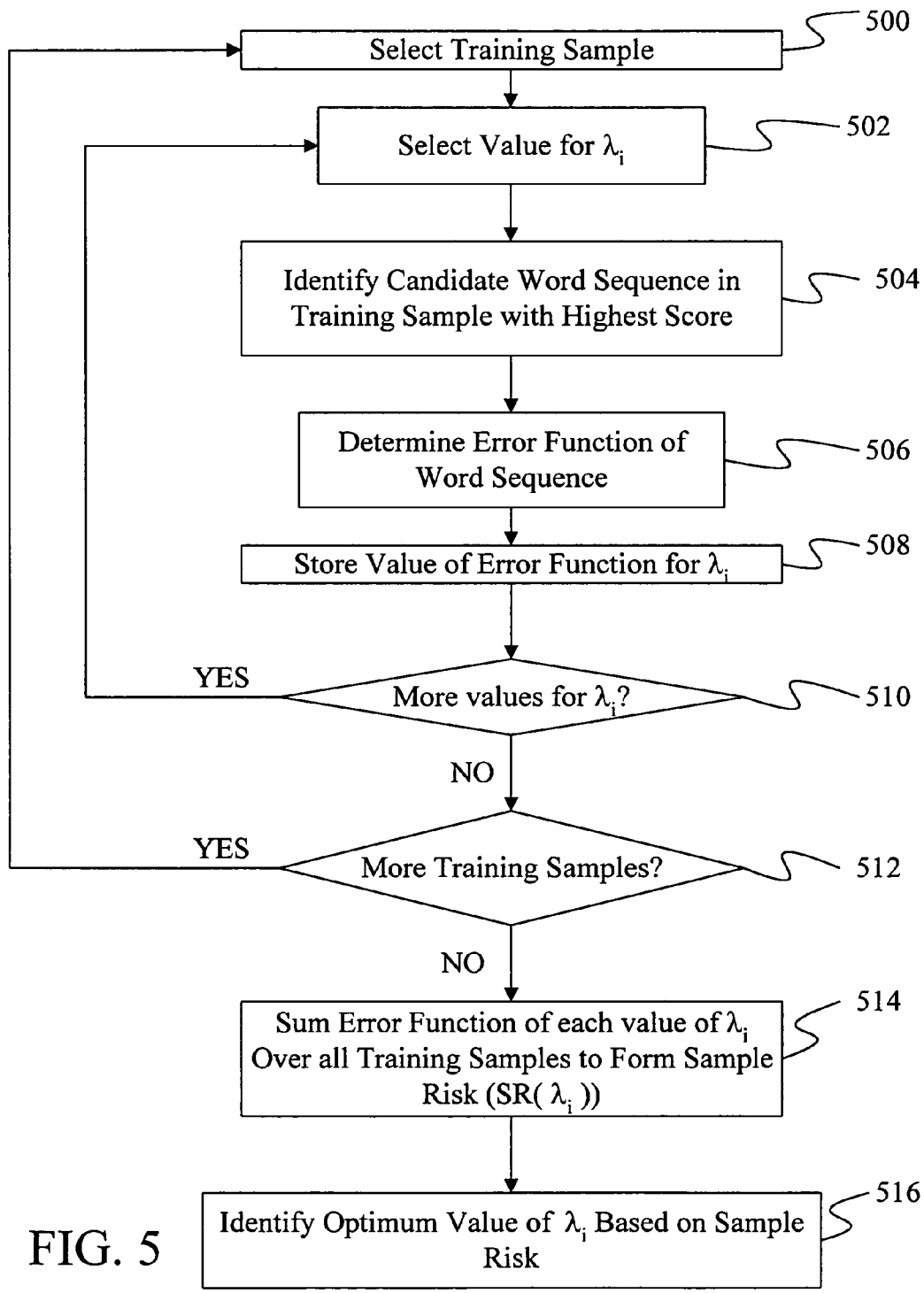
FIG. 5 is a flow diagram of a method of performing a line search under embodiments of the present invention.

In step 500 of FIG. 5, one of the training samples 404 is selected. At step 502, a value for $\lambda_i$ is selected from a set of discrete possible values for $\lambda_i$. At step 504, the selected value for $\lambda_i$ is used to generate a score for each candidate word sequence in the selected training sample using EQ. 1 above. In using EQ. 1 during step 304 of FIG. 3, $\lambda$ for all features except the current feature and the feature generated by the baseline model, $\lambda_0$, are set to 0. Under many embodiments, $\lambda_0$ for the baseline model is set to 1, and the baseline feature is a negative logarithm probability for the word sequence.

After all of the candidate word sequences in the training sample have been scored, the candidate word sequence with the highest score is selected and the error function is evaluated using the selected word sequence and the actual word sequence from actual word sequences 406 at step 506. At step 508, the value of the error function is stored for this particular value for $\lambda_i$ and the current sample.

At step 510, the method determines if there are more values for $\lambda_i$ to be evaluated. If there are more values, the process returns to step 502 and steps 504, 506 and 508 are repeated for the new value of $\lambda_i$. Steps 502, 504, 506, 508 and 510 are repeated until all of the discrete values for $\lambda_i$ have been evaluated for the current feature.

At step 512, the process determines if there are more training samples in training samples 404. If there are more training samples, the next training sample is selected at step 500 and steps 500-510 are repeated for the next training sample. When there are no further training samples at step 512, the process continues at step 514 where the values of the error function for each value of $\lambda_i$ are summed over all of the training samples to form a set of sample risks $SR(\lambda_0,\lambda_i)$, with a separate sample risk for each value of $\lambda_i$. In terms of an equation, the sample risk for a particular value of $\lambda_i$ is:

$$SR(\lambda_0, \lambda_i) = \sum_{m=1}^{M} ER(W_m^R, W_m(A_m, \lambda_0, \lambda_i)) \qquad \text{EQ. 3}$$

where $ER(W_m^R, W_m(A_m,\lambda_0,\lambda_i))$ is the error function, $W_m^R$ is the actual word sequence that corresponds to the acoustic sequence $A_m$ for training sample m and $W_m(A_m,\lambda_0,\lambda_i)$ is the highest scoring word sequence for training sample m identified using the current value of $\lambda_i$ and the feature of the baseline model.

At step 516, the optimum value for $\lambda_i$, is selected based on the sample risk values. In some embodiments, the value of $\lambda_i$ that produces the smallest sample risk is selected as the optimum value of $\lambda_i$. In other embodiments, a window is formed around each value of $\lambda_i$ and the sample risk is integrated over the window. The value of $\lambda_i$ that produces the lowest integration across the window is selected as the optimum value for $\lambda_i$ as shown by:

$$\lambda_i^* = \operatorname*{argmin}_{\lambda \in [x,y]} \int_{\lambda_i-b}^{\lambda_i+b} SR(\lambda_0, \lambda_i) \qquad \text{EQ. 4}$$

where the window size is 2b. By performing this integration, this embodiment of the present invention is able to avoid selecting unstable values of $\lambda_i$ which form isolated instances of good sample risk.

Returning to FIG. 3, after the line search has been performed to identify the optimum model parameter $\lambda_i$ for each feature $f_i$ and to return the sample risk $SR(\lambda_0,\lambda_i)$, the process continues at step 306 where the features are ranked based on the ability of the feature to reduce the sample risk relative to the baseline language model. In particular, each feature is ranked using:

$$Red_{f_i}(\lambda_i) = \frac{SR(\lambda_0) - SR(\lambda_0, \lambda_i)}{\max_{\lambda_i'}(SR(\lambda_0) - SR(\lambda_0, \lambda_i'))} \qquad \text{EQ. 5}$$

where $Red_{f_i}(\lambda_i)$ is the reduction in sample risk provided by feature $f_i$ using the optimum value of $\lambda_i$ determined in step 304, $SR(\lambda_0)$ is the sample risk determined for the best candidate word sequences in training samples 404 identified by the baseline language model, $SR(\lambda_0,\lambda_i)$ is the sample risk determined in step 304 for feature $f_i$, and the denominator is a normalization factor that is the maximum difference between the sample risk of the generative model and the sample risk of any of the features in candidate feature list 410. Thus, at step 306, each of the features is ranked based on the size of the reduction in the sample risk that each feature provides relative to the baseline model. This results in ranked features 412 of FIG. 4.

At step 308, the top N features in ranked features 412 are examined to determine which feature provides a best gain value $G_f(\lambda)$ which is calculated as:

$$G_f(\lambda) = \alpha Red_f(\lambda) - (1-\alpha) Int_f(f) \qquad \text{EQ. 6}$$

where $Red_f(\lambda)$ is a sample risk reduction score that is a more generalized for of the reduction score calculated in EQ. 5, $Int_f(f)$ is an interference function that indicates the similarity of the feature relative to other features that have already been added to the model, and $\alpha$ is a weight determined empirically on a holdout data set. Under one embodiment, $\alpha$ is equal to 0.8.

The sample risk reduction term of equation 6 is determined as:

$$Red_{f_i}(\lambda) = \frac{SR(\lambda) - SR(\lambda, \lambda_i)}{\max_{\lambda_i'}(SR(\lambda) - SR(\lambda, \lambda_i'))} \qquad \text{EQ. 7}$$

where $SR(\lambda)$ is the sample risk determined using all of the features that have previously been included in the determinative model, including the baseline model feature, $SR(\lambda,\lambda_i)$ is the sample risk determined using all of the features that have previously been included in the determinative model, including the baseline model feature, plus feature $f_i$, and the denominator is the maximum difference in sample risk determined for any of the top N features in ranked features 412. In determining the sample risks $SR(\lambda)$ and $SR(\lambda,\lambda_i)$, all of the features that were previously included in the model are used to identify a best word sequence from the candidate word sequences in the training samples. The sample risk is then computed as described above using the identified word sequences.

The interference term $Int_f(f)$ is calculated as the cosine similarity between two vectors:

$$Int_{f_i}(f) = \frac{Tr(f)^t Tr(f)}{\|Tr(f)\|\|Tr(f)\|} \qquad \text{EQ. 8}$$

where $Tr(f)$ is a column vector with an element for each training sample in training samples 404 where the value of the i-th element is:

$$\text{element}_i = \sum_{k=1}^{K} Er(W^R, W_0(A, \lambda_0) - Er(W^R, W_k(A, \lambda_k)) \qquad \text{EQ. 9}$$

where $Er(W^R, W_0(A,\lambda_0))$ is the value of the error function of the top candidate word sequence produced by baseline model 402, $Er(W^R, W_k(A,\lambda_k))$ is the value of error function for the highest scoring word sequence $W_k$ for feature $f_k$ having weight $\lambda_k$, where K is the number of features that have been previously included in the discriminative model from candidate features 410.

In EQ. 8, $Tr(f)$ is also a column vector having a separate element for each training sample in training samples 404. The value of the i-th element in $Tr(f)$ is the difference between the value of the error function for the top word sequence candidate identified by baseline model 402 for training sample i and the value of the error function for the top scoring word sequence identified by feature $f_i$ using the optimum weight identified in step 304. The denominator in EQ. 8 is the product of the Euclidean length of vectors $Tr(f)$ and $Tr(f)$.

At step 310, the feature, $f_s$, with the highest gain value as computed using EQ 6 is selected. At step 312, the value of the model parameter $\lambda_s$ for the selected feature is updated using the line search of FIG. 5. During that line search, features that have already been added to the discriminative model trainer are used in calculating the score for the possible word sequences. The values of the model parameters λ associated with those features remain constant during the line search for the updated value of $\lambda_s$.

At step 314, the updated value of $\lambda_s$ and the feature, $f_s$, are added to a list of selected features and parameters of the discriminative model 414 at step 314. The feature that is added to selected features 414 is also removed from ranked features 412.

At step 316, the gain values for the top N features remaining in ranked feature list 412 are updated using the newly added selected features and parameters to recompute column vector Tr(f) of EQ. 8.

At step 318, the process determines if more features should be added to the discriminative model. Under some embodiments, this is determined using a threshold value compared to the gain values of the top N features in ranked feature list 412. If at least one feature has a gain value that exceeds the threshold, the process returns to step 310 to select the feature with the best gain value and steps 312, 314 and 316 are repeated.

When no more features are to be added to discriminative model 414 at step 318, the selected features and their parameters can be used as a discriminative model to score candidate word sequences and thus select one candidate word sequence from a plurality of candidate word sequences as representing a phonetic string. This is shown in step 320 in FIG. 3.

As shown in FIG. 3, some embodiments of the present invention select discriminative model parameters λ and features $f$ based directly on the error function generated when using the model parameters and the features. Thus, these embodiments of the invention do not use a loss function approximation to the error function. Instead, they measure the error function directly when determining which values of the model parameters and which features to use in the discriminative model.

Although an error function has been used above, the present invention is not limited to such error functions. Instead, any performance measure with discrete values may be used in the line search of FIG. 5 in place of the error function.

Although the present invention has been described with reference to particular embodiments, workers skilled in the art will recognize that changes may be made in form and detail without departing from the spirit and scope of the invention.

What is claimed is:

1. A method comprising:
for each value of a feature weight in a set of discrete values for the feature weight: for each of a set of phonetic sequences:
   a processor using a baseline language model to identify a set of candidate word sequences from the phonetic sequence, wherein the baseline language model designates one of the candidate word sequences as a most likely word sequence and wherein the baseline language model provides a probability for each candidate word sequence;
   for each candidate word sequence in the set of candidate word sequences:
      determining a value for a feature from the candidate word sequence;
      multiplying the value of the feature weight by the value for the feature to produce a result and summing the result with the probability for the candidate word sequence provided by the baseline language model to produce a score for the candidate word sequence;
   selecting the candidate word sequence with the highest score;
   comparing the candidate word sequence with the highest score to an actual word sequence to determine a sum of the number of words in the actual word sequence that are replaced with another word in a candidate word sequence, the number of words in the actual word sequence that are omitted in the candidate word sequence, and the number of words present in the candidate word sequence that are not present in the actual word sequence to produce an error value;
   summing the error values for the phonetic sequences together to form a sample risk; and
selecting the value for the feature weight that provides the smallest sample risk as the feature weight value for a feature in a discriminative language model.

2. The method of claim 1 further comprising:
using sample risk to select a feature to include in the discriminative language model.

3. The method of claim 2 wherein selecting a feature based on a sample risk comprises determining a difference between the sample risk and a sample risk determined using the baseline model alone.

4. The method of claim 2 wherein selecting a feature further comprises determining a similarity between performance measures determined for the plurality of training samples for the feature and performance measures determined for the plurality of training samples using features that do not include the feature and that were previously selected for the language model.

5. A computer-readable storage medium storing computer-executable instructions that when executed by a processor cause the processor to perform steps comprising:
selecting a feature having a feature function for inclusion in a discriminative language model comprising a sum of weighted feature functions;
for each of a plurality of different possible values of a weight applied to the feature function for the selected feature in the sum of weighted feature functions in the discriminative language model:
   scoring each of a plurality of candidate word sequences to produce a score for each candidate word sequence, wherein each candidate word sequence score is computed through steps comprising determining a value for the feature function of the selected feature from the respective candidate word sequence, multiplying the value of the weight by the value of the feature function of the selected feature and adding the result to a probability of the respective candidate word sequence provided by a baseline language model;
   selecting a candidate word sequence of the plurality of word sequences with a best score of the scores for the candidate word sequences;
using the respective selected word sequence to generate a performance measure that is associated with the value of the weight by comparing the selected word sequence to an actual word sequence to determine a value for a discrete error function; and
using the performance measures associated with the values of the weight to select a value of the weight to store in the discriminative language model.

6. The computer-readable storage medium of claim 5 wherein scoring each of the plurality of candidate word sequences further comprises using the values of weights and feature functions of features that have previously been included in the discriminative language model.

7. The computer-readable storage medium of claim 5 further comprising repeating the steps of scoring each of a plurality of candidate word sequences, selecting a word sequence and generating a performance measure for each of a plurality of training samples.

8. The computer-readable storage medium of claim 7 wherein using the performance measure to select a value for a weight comprises combining performance measures of each training sample for each value of the weight to form a sample risk for each value and using the sample risks to select a value.

9. The computer-readable storage medium of claim 5 wherein selecting a feature comprises:
   determining a plurality of sample risks from a plurality of candidate features, with one sample risk being associated with each candidate feature;
   determining a baseline sample risk from a baseline model; and
   using the plurality of sample risks and the baseline sample risk to select a feature from the plurality of candidate features.

10. The computer-readable storage medium of claim 9 wherein using the plurality of sample risks and the baseline sample risk comprises generating a score for each feature, each score being based on the difference between the sample risk associated with the feature and the baseline sample risk.

11. The computer-readable storage medium of claim 10 wherein generating a score further comprises determining a measure of the interference between the feature and features that have previously been inserted into the discriminative language model.

12. A method of selecting features for a discriminative language model, the method comprising:
   for each of a set of candidate features, determining a difference between a performance measure associated with a discriminative language model that uses the feature and a performance measure associated with a discriminative language model that does not use the feature, wherein the performance measure associated with the discriminative language model that uses the feature is based on a count of the number of words in an actual word sequence that are omitted in a candidate word sequence selected using the discriminative language model that uses the feature, wherein the discriminative language model is a linear discriminative function that provides a score for a candidate word sequence wherein the linear discriminative function comprises a weighted sum of feature function values that includes a feature function value for the feature and a separate probability for the candidate word sequence;
   using each difference to score each candidate feature; and
   selecting a candidate feature based on the scores.

13. The method of claim 12 wherein using each difference to score each candidate feature further comprises:
   determining an interference score for the feature, the interference score indicating the similarity in the performance of a discriminative language model that uses the feature and a discriminative language model that does not use the feature; and
   using the interference score and the difference to score the feature.

14. The method of claim 12 wherein determining the performance measure for the discriminative model that uses the feature comprises:
   determining a plurality of performance measures using different values for a model parameter associated with the feature;
   selecting a value for the model parameter based on the plurality of performance measures; and
   using the selected value of the model parameter when determining the performance measure for the discriminative model that uses the feature.

* * * * *